Patented Aug. 7, 1945

2,381,709

UNITED STATES PATENT OFFICE 2,381,709

PRODUCTION OF ORGANIC COMPOUNDS CONTAINING NITROGEN

Frank A. Apgar and John W. Teter, Chicago, Ill., assignors to Sinclair Refining Company, New York, N. Y., a corporation of Maine No Drawing. Application November 5, 1942, Serial No. 464,636

8 Claims. (Cl. 260—464)

This invention deals with the production of amines, nitriles and their derivatives from unsaturated hydrocarbons available in gas mixtures produced in the processing of hydrocarbon oils as in the refining of petroleum by direct catalytic reaction with ammonia. This application is in part a continuation of our application Serial No. 289,186 filed August 9, 1939.

Organic nitrogen compounds of this sort have a variety of present uses in industry and have potentialities of wider use both as addition agents in lubricants and fuels and as raw materials for the production of other chemicals. Amines and their derivatives are useful as anti-knock agents and color stabilizers in motor fuels, as anti-corrosion agents and as anti-sludging, anti-lacquering and color stabilizing agents in lubricants. Nitriles are useful oiliness agents in lubricants and are easily converted to amines. The cost of production by present commercial methods is considerable and restricts the use of these chemicals. Some of the higher molecular weight compounds, for instance the aliphatic amines of more than four or five carbon atoms, are not produced commercially but are especially useful as lubricant addition agents.

The object of this invention is to produce such compounds, of low or high molecular weight, in an economical way.

Generically, the reaction of direct amination is one in which one N—H bond is activated and in which the olefine double bond is in the active state. The reaction proceeds when the reactants, thus activated, are in intimate contact. One atom of hydrogen from the activated N—H group of the ammonia attaches to one of the double bonded carbon atoms in the olefine, and the NH₂ radical attaches to the other carbon atoms. This forms the primary amine, as follows:

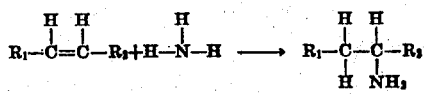

The secondary amine is formed by substitution for one of the hydrogen atoms of the amino radical in the primary amine, involving activation of another N—H bond. Similarly for the tertiary amine in relation to the secondary amine.

To obtain yields of commercial significance, it is essential to employ a selective catalyst which effectively promotes the direct amination reaction in competition with polymerization of the olefine and with other reactions such as hydrogenation, cracking or dehydrogenation. A number of catalysts have been found which, with different degrees of effectiveness, activate an N—H bond of ammonia and the olefine double bond and thereby promote the amination reaction. Among these are iron, nickel and cobalt. While the reaction takes place to some extent at atmospheric pressure, better yields are obtained at higher pressures. Temperatures ranging from about 400° F. to about 725° F. are useful. The optimum temperature varies with the particular olefine and with the activity of the catalyst. Thus with an unpromoted cobalt catalyst suspended on washed asbestos fibers the optimum temperature as applied to a high molecular weight olefine such as n-dodecene-1 approximates 500° F.–550° F., while as applied to propylene, the optimum temperature approximates 675° F.–700° F. In general as applied to olefines containing more than 3 carbon atoms, temperatures ranging from about 400° F. to about 650° F. are useful.

An example of the invention as applied to high molecular weight compounds is as follows: An olefine, n-dodecene-1, is reacted with anhydrous ammonia, in a 1 to 1.64 molar ratio, in the presence of an active unpromoted cobalt catalyst suspended on washed asbestos fibers. A temperature of 500° F. to 550° F. is maintained for 20 hours. If carried out in a closed system, as in a bomb, a pressure of 2000 pounds per square inch is developed. There is a drop of about 120 pounds per square inch as the reaction proceeds. At the end of the run, unreacted ammonia is removed by stabilization and unreacted olefine is distilled off, leaving the olefine-free product which may be mixed with the product extracted from the catalyst mass, after removal of the benzene used as the extractant.

About 50% to 60% of the olefine is consumed under the conditions stated. The organic nitrogen compounds produced equal about 12% by weight of the olefine charged or 20% to 25% of the olefine consumed; and consist of primary lauryl amine, di-lauryl amine, lauro-nitrile and, under some conditions, lauric acid amide. These are recovered in fractions by distillation of the reaction product. Unreacted olefine and ammonia are recycled. When precautions are taken to avoid the presence of adventitious oxygen, including oxygen in the form of water, the lauric acid amide is not produced in appreciable amount. Oxygen or oxygen compounds are not necessary to the nitrogen fixation. In addition, there is some formation of useful low boiling nitrogen compounds of fewer carbon atoms than the olefine charged, e. g., octo-nitrile. Other side reactions yield paraffins by hydrogenation or new olefines by polymerization.

A typical yield under the conditions stated is:

| Product | Weight, percent of olefine charged | Weight, percent of olefine consumed |
|---|---|---|
| Organic nitrogen | 12 | 22.6 |
| Paraffin | 26 | 49.0 |
| Polymers | 10 | 19.0 |
| Loss | 5 | 9.4 |
| Recycle olefine | 47 | |
| | 100 | 100.0 |

The product identified above as organic nitrogen, forming 22.6% of the olefine consumed, consists on the same basis of about 1% of octo-nitrile, about 20% of primary lauryl amine and lauronitrile, with a slight amount of polymer olefine, and about 1.5% of di-lauryl amine.

The catalyst in the example given is prepared by suspending washed asbestos fibers in an aqueous solution of cobalt acetate to which aqueous sodium hydroxide is added slowly with good agitation, following which the mass is filtered, washed with distilled water and then gradually increased in temperature to 650° F. The cobalt is then reduced to an active catalytic metal by exposure to a slow stream of hydrogen for about 100 hours at 550° F. The final catalyst mass contains about 27% of cobalt by weight. In reacting 6.8 mols of n-dodecene-1 in a three liter shaker bomb, a catalyst mass of 300 grams is used. After the run, the mass is freed of reaction products by benzene extraction, which permits recovery of such products by subsequent removal of the benzene.

Reduced $Fe_3O_4$ promoted with 1.59% $K_2O$ and 1.31% $Al_2O_3$ is a useful catalyst, best results being obtained when the time of reduction is relatively short and the temperature relatively high. For example, reduction at 850° F. for 32 hours gives a better catalyst than reduction for 6 hours at 750° F. or for much longer times at 850° F.

Reduced $Ni_2O_3$ gives better results than the iron catalyst. Increased length of the period of reduction shows no great improving effect. Equally satisfactory catalysts, within insignificant limits, may be prepared at 16 hours and 100 hours. Reduction at 540°–550° F., for 100 hours, is somewhat better than reduction at 510° F. for 16 hours. Reduction of $Ni(OH)_2$ for 24 hours at 575° F. produces a catalyst which, supported on asbestos fibers, gives an amine yield of about 5% of the olefine charge, or close to half the yield obtained with reduced cobalt similarly supported.

All of the following metallic catalysts promote to some extent the direct amination of olefines with ammonia. By a "metallic" catalyst, as used herein and in the claims, is meant free metals, metallic oxides and metallic salts.

| Catalyst | Promoter | Support |
|---|---|---|
| $Fe_3O_4$ | $K_2O$ and $Al_2O_3$ | |
| Ni | Reduced $Ni_2O_3$ | Asbestos fibers. |
| Ni | CuCrO | |
| Cu | | |
| Cu | | $Al_2O_3$. |
| Cu | MgO | |
| Fe | | Asbestos fibers. |
| Co | | Do. |
| Co | | Do. |
| Co | $ThO_2$ | |
| Co | do | $Al_2O_3$. |
| Cd | $Cr_2O_3$ | Do. |
| $Al_2O_3$ | | Do. |
| $ZnCl_2$ | | |
| $(NH_4)_3PO_4$ | | |
| $K(NH_4)SO_4$ | | |

Other olefines than dodecene may be used with corresponding difference in the number of carbon atoms in the product. For example, amines are produced by catalytic reaction of ammonia with the heptene and octene fractions of polymer gasoline boiling between 175° and 250° F., or with hydrocarbon mixtures including gas olefines such as are found in stabilizer reflux. Frequently there also is formation of useful organic nitrogen compounds containing a greater number of carbon atoms than the olefin charged.

This process of direct amination of olefines using a selected catalyst affords a new and less expensive way of producing amines, nitriles and their derivatives, and of producing certain amines, nitriles and derivatives which have not hitherto been produced by commercial methods.

We claim:

1. In the production of amines and nitriles, the improvement which comprises reacting an olefine containing more than three carbon atoms with ammonia at a temperature of about 400° F. to about 650° F. in the presence of a metallic catalyst selectively promoting the amination reaction.

2. In the production of amines and nitriles, the improvement which comprises reacting an olefine containing more than three carbon atoms with ammonia at a temperature of about 400° F. to about 650° F. in the presence of a metallic catalyst selectively activating the N—H bond and the olefine double bond.

3. In the production of amines and nitriles, the improvement which comprises reacting an olefine containing more than four carbon atoms with ammonia at a temperature of about 400° F. to about 650° F. in the presence of a metallic catalyst selectively promoting the amination reaction.

4. In the production of amines and nitriles, the improvement which comprises reacting an olefine with ammonia at a temperature of about 400° F. to about 725° F. in the presence of a cobalt catalyst.

5. In the production of amines and nitriles, the improvement which comprises reacting a hydrocarbon gas mixture including olefines containing more than three carbon atoms with ammonia at a temperature of about 400° F. to about 650° F. in the presence of a metallic catalyst selectively promoting the amination reaction.

6. In the production of amines and nitriles, the improvement which comprises reacting a dodecene with ammonia at a temperature of about 400° F. to about 650° F. in the presence of a metallic catalyst selectively promoting the amination reaction.

7. In the production of amines and nitriles, the improvement which comprises reacting an olefine containing more than three carbon atoms with ammonia at a temperature of about 400° F. to about 650° F. in the presence of a catalyst of the group consisting of iron, nickel and cobalt.

8. In the production of amines and nitriles, the improvement which comprises reacting an olefine with ammonia at a temperature of about 400° F. to about 725° F. in the presence of a catalyst comprising metallic cobalt suspended on asbestos fibers.

FRANK A. APGAR.
JOHN W. TETER.